US009189091B2

(12) United States Patent
Koenig et al.

(10) Patent No.: US 9,189,091 B2
(45) Date of Patent: Nov. 17, 2015

(54) ASSIGNMENT OF CONTROL OF PERIPHERALS OF A COMPUTING DEVICE

(71) Applicant: Microsoft Corporation, Redmond, WA (US)

(72) Inventors: Michael F. Koenig, Bellevue, WA (US); Ira Snyder, Bellevue, WA (US); Jack Creasey, Redmond, WA (US); Jai Srinivasan, Kirkland, WA (US); Kanchan Mitra, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/787,008

(22) Filed: Mar. 6, 2013

(65) Prior Publication Data

US 2013/0185463 A1    Jul. 18, 2013

Related U.S. Application Data

(63) Continuation of application No. 12/817,766, filed on Jun. 17, 2010.

(60) Provisional application No. 61/304,039, filed on Feb. 12, 2010.

(51) Int. Cl.
*G06F 3/00*     (2006.01)
*G06F 13/00*    (2006.01)
*G06F 3/038*    (2013.01)
*G06F 9/44*     (2006.01)

(52) U.S. Cl.
CPC .............. *G06F 3/038* (2013.01); *G06F 9/4411* (2013.01)

(58) Field of Classification Search
None
See application file for complete search history.

(56) References Cited

U.S. PATENT DOCUMENTS

| 5,012,509 | A  | * | 4/1991  | Nakamura et al. | 348/14.08 |
|-----------|----|---|---------|-----------------|-----------|
| 6,151,621 | A  | * | 11/2000 | Colyer et al.   | 709/204   |
| 6,154,787 | A  | * | 11/2000 | Urevig et al.   | 710/8     |
| 7,124,367 | B2 | * | 10/2006 | Anderson et al. | 715/735   |
| 7,328,261 | B2 | * | 2/2008  | Husain et al.   | 709/224   |
| 7,353,252 | B1 | * | 4/2008  | Yang et al.     | 709/204   |
| 8,370,550 | B2 | * | 2/2013  | Creasey et al.  | 710/104   |
| 8,886,842 | B2 | * | 11/2014 | Chandler et al. | 710/3     |
| 2004/0073912 | A1 | * | 4/2004 | Meza          | 719/321   |
| 2004/0148375 | A1 | * | 7/2004 | Levett et al.  | 709/223   |
| 2006/0080344 | A1 | * | 4/2006 | McKibben et al.| 707/100   |
| 2007/0190939 | A1 | * | 8/2007 | Abel           | 455/41.2  |
| 2008/0168118 | A1 | * | 7/2008 | Hickey et al.  | 709/201   |
| 2009/0083450 | A1 | * | 3/2009 | Peterson       | 710/10    |

(Continued)

*Primary Examiner* — Michael Sun
(74) *Attorney, Agent, or Firm* — Aneesh Mehta; Kate Drakos; Micky Minhas

(57) ABSTRACT

Techniques for enabling software-assisted assignment of control of peripherals (e.g., assigning ownership of or assigning access to the peripherals) by a computing device. In accordance with techniques described herein, assignment of control of peripherals is aided by input from software facilities that instruct a peripheral management facility regarding assignment of peripherals. Software facilities may instruct the peripheral management facility in different ways. In some cases, a software facility may instruct the peripheral management facility how to assign control of a peripheral in a particular way, while in other cases a software facility may instruct the peripheral management facility how to assign control of a group of peripherals. In other cases, a software facility may not instruct a peripheral management facility how to assign control of peripherals, but may identify one or more groups of peripherals for which control should be assigned as a group.

20 Claims, 14 Drawing Sheets

(56) References Cited

U.S. PATENT DOCUMENTS

2011/0246552 A1* 10/2011 Nicholson et al. ............ 709/202
2012/0166642 A1* 6/2012 Saint Clair et al. ........... 709/225
2012/0297306 A1* 11/2012 Hassan et al. ................. 715/735

* cited by examiner

ASSIGNMENT OF CONTROL OF PERIPHERALS OF A COMPUTING DEVICE

CROSS REFERENCE TO RELATED APPLICATIONS

This is a continuation application of application Ser. No. 12/817,766, filed Jun. 17, 2010, which claims the benefit of provisional application 61/304,039, filed Feb. 12, 2010 entitled "ASSIGNING INTERFACE DEVICE TO TERMINAL GROUPS", the entirety of which is incorporated herein by reference.

BACKGROUND

Computing devices, including personal computers, are typically adapted to be operated by one user at a time. Such a computing device is configured to allow the user to interact with all peripherals connected to the computing device, including user interface peripherals like a display, keyboard, and mouse. When the computing device first starts and detects connected peripherals, or when a peripheral is newly attached to the computing device, the computing device is configured to manage each of those peripherals in the same way. The computing device may provide access to each of the peripherals to all users of the computing device or to the user that is presently operating the computing device.

In some cases, a computing device may be operated by more than one user at a time. In some such cases, assigning ownership of or access to individual peripherals to certain users may be desirable. This may be done such that users do not attempt to access a peripheral at a same time, to protect privacy of data stored by each user on a peripheral and to ensure that each user is able to interact with the computing device with a full set of user interface peripherals (e.g., such that each user has a display, keyboard, and mouse). Because the computing device does not have functionality to manage peripherals different and to assign peripherals to different users, in such cases the users or an administrator will manually configure the computing device to assign peripherals to each user. To assign the peripherals, the user or administrator will examine the set of available peripherals and select peripherals to be assigned to each user, then reconfigure the computing device to identify that the selected peripherals can be accessed and used only by the identified user.

SUMMARY

Conventional techniques for assigning peripherals connected to a computing device to different users are limited to performing such assignment manually, according to direct input from a user or administrator. Such a process can be time consuming and difficult. Additionally, such a process requires knowledge of how peripherals are organized and managed by a computing device so that information about the peripherals can be located on the device and the peripherals can be assigned.

Described herein are techniques for enabling software-assisted assignment of control of peripherals (e.g., assigning ownership of or assigning access to the peripherals) by a computing device. In accordance with techniques described herein, assignment of control of peripherals is aided by input from software facilities that instruct a peripheral management facility regarding assignment of peripherals. Software facilities may instruct the peripheral management facility in different ways. In some cases, a software facility may instruct the peripheral management facility how to assign control of a peripheral in a particular way, while in other cases a software facility may instruct the peripheral management facility how to assign control of a group of peripherals. In other cases, a software facility may not instruct a peripheral management facility an exact manner of assigning control of peripherals, but may identify one or more groups of peripherals for which control should be assigned as a group. In other cases, a software facility may instruct a peripheral management facility to assign control of portions of a peripheral (e.g., time-based portions or physical portions) in different ways, such as to different user sessions.

In one exemplary implementation, a manufacturer or vendor of a composite peripheral that includes multiple different peripheral devices may provide a driver that includes peripheral assignment functionality. When the composite peripheral is connected to a computing device, a peripheral management facility of the computing device may query available drivers for how control of the peripherals should be assigned. When the peripheral management facility queries the driver that matches the composite peripheral, the driver may instruct the peripheral management facility that control of each of the peripherals of the composite peripheral should be assigned together, as a group. The driver may additionally instruct the peripheral management facility to assign ownership of or access to the group of peripherals to a particular user or user session.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
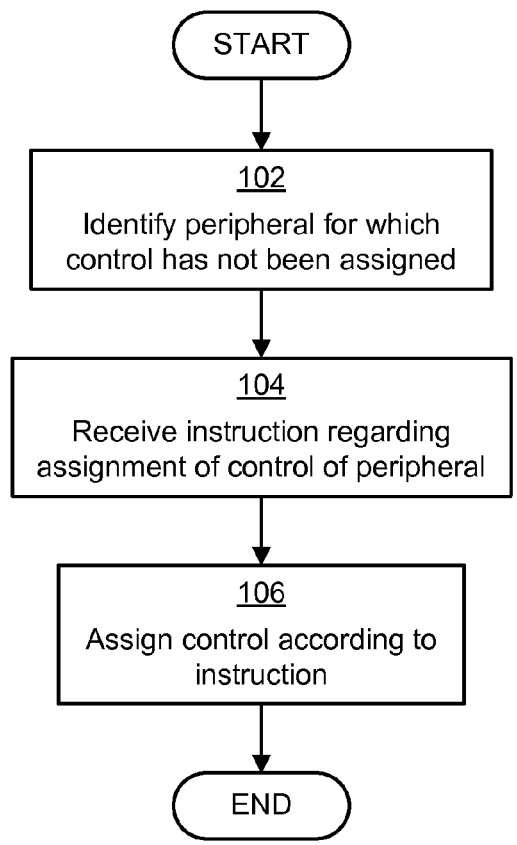
FIG. 1 is a flowchart of one process that may be carried out in some embodiments for assigning control of peripherals based on instructions received from software facilities.

When a peripheral is connected to a computing device, using conventional techniques the peripheral may be made available to all users of the computing device, without ownership of or access to the peripheral being assigned to any particular user or user session. This practice may introduce problems in the computing device. For example, security problems may arise, such as where the peripheral is a storage device storing sensitive information that should only be accessed by a user that owns the storage device. When the peripheral is not assigned to a particular user, other users may access the peripheral, which may compromise the sensitive information. As another example, access problems may arise, such as (using the above example again, where the peripheral is a storage device) where a user assumes that the user has exclusive access to the storage device and performs some work based on that assumption, and discovers later that another user has accessed and manipulated data on the storage device in a way that complicates the user's work.

Assignment of control of peripherals to particular users or user sessions may remedy some of these problems. Using conventional techniques, however, to assign peripherals to users or user sessions, the user or an administrator would have to make low-level changes in the operating system manually, through providing explicit input. Such a process requires knowledge not only of how and where the particular operating system stores information about peripherals, but also about user sessions and how to assign control of peripherals to user sessions. Such a manual process is intensive, even where a user has the required knowledge.

Further, composite peripherals complicate the process of selecting and assigning control of peripherals. A composite peripheral includes multiple peripherals that may be used together, including devices that are physically packaged together. A computing device conventionally manages each of the peripherals of a composite peripheral separately, without identifying that the peripherals are related. A user or administrator that is attempting to assign control of peripherals manually may therefore have difficulty in finding and identifying all peripherals to be assigned to a particular user, including all peripherals of a composite peripheral.

Described herein are techniques for enabling peripherals to be assigned to users or user sessions without relying on explicit user input. In accordance with some of these techniques, assignment of peripherals is aided by input from software facilities that instruct a peripheral management facility regarding assignment of control of peripherals. Software facilities may instruct the peripheral management facility in different ways. In some cases, a software facility may instruct the peripheral management facility how to assign control of a peripheral in a particular way, while in other cases a software facility may instruct the peripheral management facility how to assign control of a group of peripherals. In other cases, a software facility may not instruct a peripheral management facility regarding a party to which to assign control of peripherals, but may identify one or more groups of peripherals for which control should be assigned together, as a group. A software facility may instruct a peripheral management facility in any suitable manner, to assign peripherals in any suitable manner, as embodiments are not limited to operating with any particular type of instructions or with any particular type of peripheral management.

As used herein, a peripheral is an electronic device that may be attached to a computing device via any suitable wired and/or wireless communication bus. A peripheral may be physically separate from the computing device and encased in a separate housing from the computing device, or may be physically attached to the computing device and encased in a same housing. In some wired and/or wireless communications buses with which embodiments may operate, peripherals may be coupled to the computing device in a hierarchy. The hierarchy may allow connection of peripherals via hubs that permit multiple peripherals to be connected to the computing device via a single point. Multiple hubs may be joined together to form the hierarchy. In some cases, a hub may be incorporated into a peripheral, rather than being separate from peripherals. For example, a keyboard may be connected to a computing device and may include, in the housing of the keyboard, a port to permit another device to be connected to the keyboard. Examples of buses that may be used in embodiments include USB 1.1/2.0/3.0, PS/2, Bluetooth, infrared, and FireWire, though others are possible.

A composite peripheral is a group of two or more peripherals that are joined in some way. The peripherals may be joined physically, such as where the peripherals are encased in a same housing. The peripherals may also be joined functionally, such as where the peripherals are not physically joined but are adapted to be used together. Composite peripherals may be identified by a manufacturer or vendor who intends the peripherals to be joined, or may be identified by any other suitable party (e.g., a user, an administrator, a third-party software vendor, etc.).

As discussed below, in embodiments a software facility instructs a peripheral management facility regarding assigning control of peripherals to users or user sessions. Embodiments are not limited to operating with any particular type of software facility. In some embodiments, a software facility may be software created by a manufacturer or vendor of a peripheral, such as a driver or installer provided by the manufacturer or vendor. In other embodiments, a software facility may be provided by a manufacturer or vendor of the computing device (or software installed on the computing device) to which the peripheral is connected. In some such embodiments, the software facility may be system software of the computing device, including as a portion of the operating system of the computing device. In still other embodiments, a software facility may be software provided by a third party, unrelated to the peripheral or the computing device. In some such embodiments, the software facility may be application software installed on the computing device.

A user of a computing device may be an account or profile created on the computing device and which a person uses to access and operate the computing device. When a user is logged in to the computing device or is operating the computing device, a user session may be created for the user that persists while the user is logged in or operating the computing device. A user session may provide a unique instance of an operating system environment for a user, including a unique instance of various system resources. Processing performed by a user within a user session may be partitioned from other users and other user sessions, though users may be able to communicate between sessions.

In embodiments, control of peripherals may be assigned to one or more users and/or to one or more user sessions. For ease of description, in various exemplary embodiments described below, peripherals may be described as being assigned to one user. Embodiments are not limited, however, to assigning peripherals to a single user or to users.

Control of peripherals may be assigned in any suitable manner. The manner of assignment may vary in embodiments based on how a computing device manages peripherals and access rights. Assignment of control of peripherals may comprise assigning ownership of a peripheral. In some embodiment, assigning ownership of a peripheral may comprise assigning all access rights and/or management rights to a user (or user session). Assignment of control of peripherals may alternatively comprise assigning all or some access rights. Access rights may include rights to use the peripheral in specified ways, such as read access or write access, while management rights may include rights to alter the peripheral, such as altering software or settings of the peripheral or disconnect the peripheral. Embodiments are not limited to carrying out any particular type of assignment of control. Additionally, assigning control of peripherals may include assigning control of portions of peripherals, such as where control of one time-based or physical portion of a peripheral is assigned in one way and control of another time-based or physical portion of a peripheral is assigned in another way. For example, different portions of a display screen may be assigned for use by different user sessions.

In some embodiments, peripherals may be additionally assigned using rules. When a peripheral is connected, the rules may be evaluated to determine how to manage the peripheral. In some embodiments that use such rules, rules may be applied to determine how to manage peripherals only after software facilities have instructed how to assign some or all of the peripherals. Some embodiments that apply rules may use rules as described in U.S. Provisional Patent Application No. 61/304,077, filed Feb. 12, 2010, entitled "Managing USB devices based on logical groups" ("the '077 application") and in non-provisional U.S. Patent Application No. 12/839,274, filed Jul. 19, 2010, entitled "Rule-based assignment of peripherals of a computing device," and claiming priority to the '077 application ("the '274 application"), which are incorporated herein by reference in its entirety and at least for their discussion of rule-based assignment of control of peripherals. The '274 application is incorporated herein at least to the extent that its content is described in the '077 application.

Described below are various exemplary embodiments of systems that enable software facilities to instruct peripheral management facilities regarding assignment of control of peripherals. The embodiments described below are merely illustrative of ways in which some embodiments may operate. Embodiments are not limited to operating according to the exemplary techniques described below.

Further, in some embodiments described below, exemplary peripherals are described as composite peripherals that are a display device including a hub to which a user may attach a keyboard and a mouse to form a terminal group. Embodiments are not limited, however, to operating with any particular type of peripherals or to operating with composite peripherals. Embodiments may operate with any suitable type of peripherals.

FIG. 1 shows one exemplary process that may be used in some embodiments to assign peripherals to user sessions of a computing device. The process 100 may be carried out at any suitable time. As one example, the process 100 may be carried out when the computing device is starting up and is determining which peripherals are connected to the computing device and are to be managed. Additionally or alternatively, the process 100 may be carried out when a peripheral is first connected to the computing device.

The process 100 begins in block 102, in which a peripheral management facility identifies a peripheral for which control has not been assigned. The peripheral management facility may identify the peripheral in any suitable manner, including by actively or passively identifying the peripheral. In some embodiments, the peripheral may be passively identified when the peripheral management facility receives a signal from another component of the computing device. For example, an operating system may carry out an initialization process for peripherals, during which drivers may be loaded for the peripheral, resources may be allocated, and any other suitable initialization steps taken. In some embodiments that execute such an initialization process, during the initialization process, one component of the operating system may provide to the peripheral management facility an indication that the initialization process is being conducted for the peripheral. The peripheral management facility may then identify, based on the indication, that control of the peripheral has not been assigned. The peripheral management facility may identify that control has not been assigned based only on the indication or based on the indication and/or any other information (e.g., records of the peripheral management facility indicating peripherals for which control has been assigned).

Following identification of the peripheral in block 102, the peripheral management facility receives in block 104 an instruction regarding assignment of control of the peripheral. The instruction may be received via any suitable message-passing protocol or information-sharing technique that may be used on a computing device for sharing information between processes executing on the computing device. For example, the instruction may be received via an operating system-based protocol, such as a message-passing protocol of the Microsoft® Windows® operating system, or may be received via storage in a shared memory location.

The instruction to assign control of the peripheral may be received from any suitable software facility on the computing device to which the peripheral is connected, including from a driver related to the peripheral or from a software application program executing on the computing device. The instruction may include any suitable direction to the peripheral management facility regarding how control of the peripheral is to be assigned, some examples of which are described in greater detail below in connection with FIGS. 4A-4C. In some cases, an instruction received in block 104 may include a direction to assign a particular type of control of the peripheral to one or more particular user sessions, such as by assigning ownership of the peripheral to one particular user session and/or access rights for the peripheral to the same and/or another particular user session. In some cases, the instruction received in block 104 may include a direction to assign a particular type of control without identifying a particular user session to which to assign the control. This may be the case, for example, where the instruction identifies that control of the peripheral (e.g., ownership of the peripheral) should be assigned to a unique user session, such that peripherals of the same type are assigned to different user sessions (e.g., each keyboard is assigned to a unique user session). The instruction received in this case may identify that the peripheral should be assigned to a unique user session, without directing to which user session the control is to be assigned. In other cases, an instruction received in block 104 may include a direction to assign control of two or more peripherals as a group, such as where the peripheral identified in block 102 is a member of a composite peripheral and the instruction directs that control of all peripherals of the composite peripherals should be assigned together. In some cases, the instruction may include both a direction to assign a particular type of control and a direction to assign control of peripherals as a group. Embodiments are not limited to receiving any particular type of direction in the instruction.

The instruction may be received in block 104 in any suitable manner. In some embodiments, the instruction may be received in block 104 in response to a query sent by the peripheral management facility to the software facility providing the instruction. In other embodiments, the instruction may be received in block 104 without the peripheral management requesting information. Examples of ways in which the instruction may be received are discussed in greater detail below.

In block 106, after the instruction is received at the peripheral management facility, the peripheral management facility assigns control of the peripheral in accordance with the instruction. The manner in which control is assigned in block 106 may vary depending on how the computing device manages peripherals and depending on how the instruction directs control to be assigned. Assigning control in block 106 may comprise updating records maintained by an operating system regarding users, user sessions, and/or peripherals, such as to identify in the records that control of one or more peripherals has been assigned and in what manner the control has been assigned (e.g., to which user session the control has been assigned).

Once the control has been assigned in block 106, the process 100 ends. The peripheral may then be used according the assignment of control. For example, the operating system may permit a first user operating a user session to which at least some control of the peripheral has been assigned to operate or interact with the peripheral, and the operating system may prevent a second user operating a different user session to which no control of the peripheral has been assigned from interacting with the peripheral in any way. As another example, the operating system may permit a first user to interact with the peripheral in a way that is allowed by the access rights to the peripheral that have been given to the first user as part of the assignment of control, and may prevent the first user from interacting with the peripheral in a second way that is not allowed by the access rights.

The process 100 is described above as being carried out for one peripheral. The process 100 may be repeated for multiple peripherals connected to a computing device. In some cases, the process 100 may be carried out for each of the peripherals connected to the computing device, such that control of all peripherals is assigned according to instructions received from software facilities for the peripherals. In other cases, however, control of at least some peripherals may be assigned using a different process, including according to pre-established rules and policies regarding assignment of control of peripherals. In some such cases, assignment of control of peripherals for which no instructions were received may be carried out using the rules and policies. Rule-based assignment of control of peripherals may be carried out in any suitable manner, including according to techniques described in the '077 application referenced above and the '274 application referenced above.

Rules and policies may also be used in assigning control of peripherals based on instructions received from software facilities. In the process 100 of FIG. 1, control is assigned according to the instruction received. In other processes, however, an instruction may be first evaluated to determine whether assignment of control in the manner directed by the instruction is permitted by the rules or policy. For example, if an instruction directs assignment of control of peripherals in such a manner that would result in a particular user session being assigned control of two keyboards (or any other type of peripheral that a policy may identify should be unique per user session), control of the peripherals may not be assigned in that manner or a user/administrator may be prompted to confirm that the directed assignment is correct.

Figure 2:
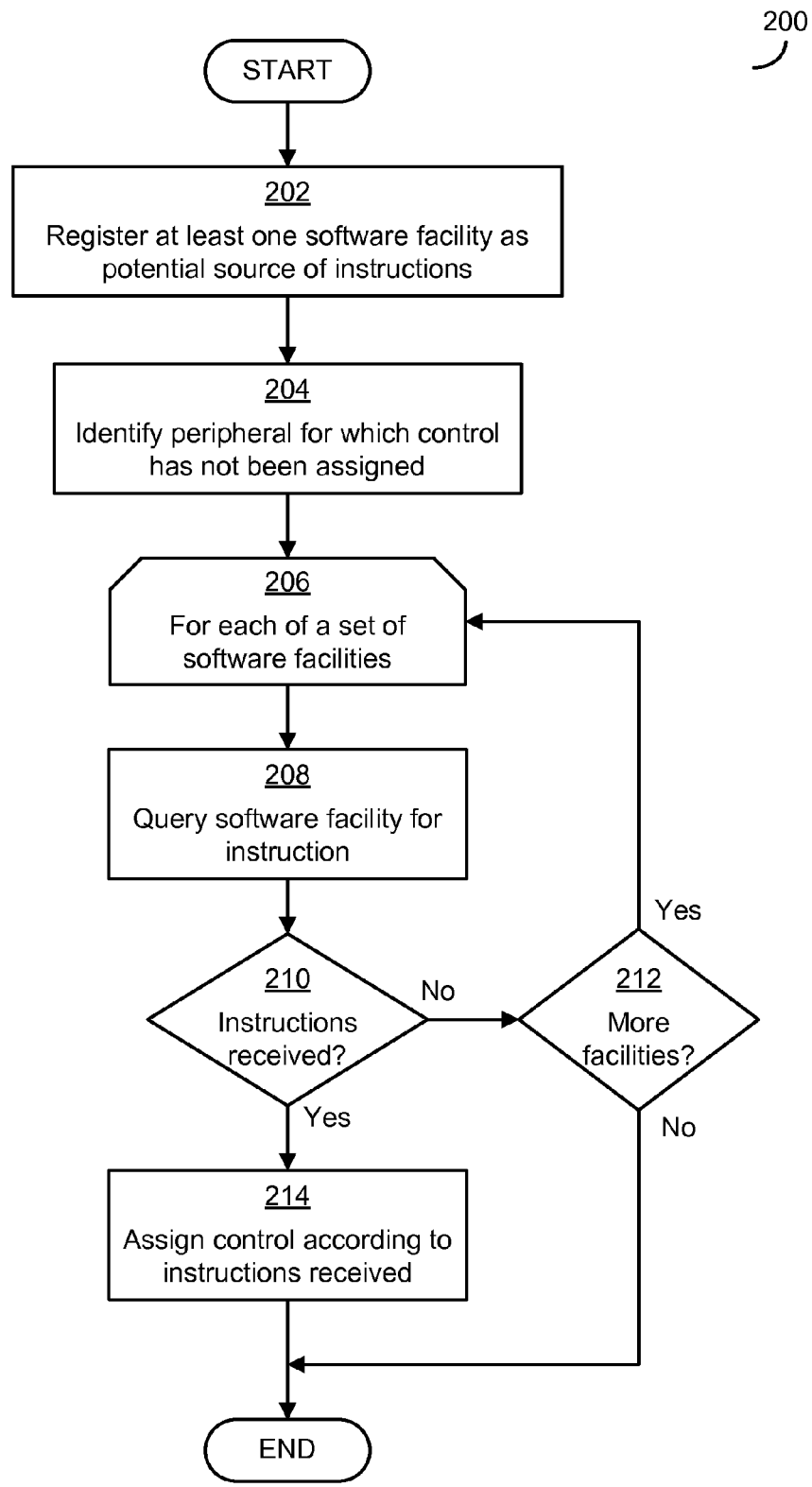
FIG. 2 is a flowchart of one process that may be carried out in some embodiments for querying software facilities regarding assigning control of peripherals.
Figure 3:
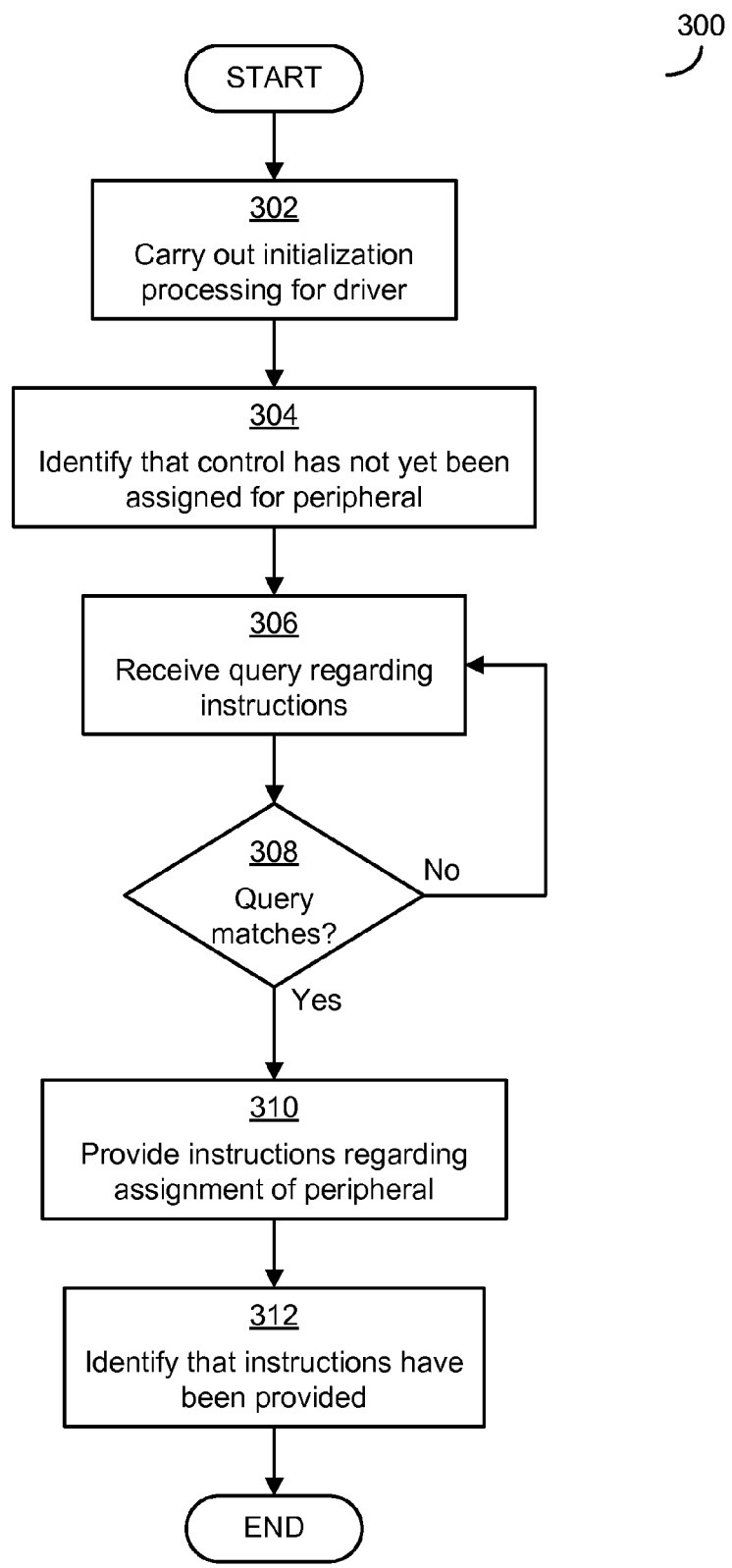
FIG. 3 is a flowchart of one process that may be carried out in some embodiments for providing instruction regarding assigning control of peripherals.

As discussed above, instructions regarding assignment of peripherals may be received in any suitable manner, including as responses to queries regarding whether instructions are available. FIGS. 2 and 3 show exemplary processes that may be used in some embodiments for querying software facilities to determine whether instructions are available for assigning control of a peripheral. Embodiments are not limited to performing querying to determine whether instructions are available, and embodiments that do perform querying are not limited to implementing the exemplary processes of FIGS. 2 and 3. Other processes are possible.

The process 200 begins in block 202, in which at least one software facility is registered with a peripheral management facility as a potential source of instructions regarding assignment of peripherals. The registration of block 202 may be carried out in any suitable manner. For example, information regarding a software facility may be stored in a record accessible by the peripheral management facility. The information may identify the software facility and/or a way for the peripheral management facility to communicate with the software facility regarding assignment of control. In some embodiments, the information may also identify a particular peripheral or type of peripheral for which the software facility is capable of providing instructions.

The registration of block 202 may be carried out in any suitable manner. In some embodiments, when a software facility that is capable of providing instructions is installed on the computing device (e.g., when a driver for a peripheral is installed on the computing device), a component of the operating system may store in a record accessible by the peripheral management facility the information regarding the software facility that is stored during the registration. In such a registration process, the software facility may not communicate with the peripheral management facility during the registration. In other embodiments, a software facility may explicitly communicate, at any time, with the peripheral management facility to provide the information regarding that software facility that is stored during the registration.

Regardless of how the registration information is received and stored, following the registration of block 202, at least one software facility is registered as a potential source of instructions regarding assignment of control of peripherals.

In block 204, a peripheral for which control is to be assigned is identified. The peripheral may be identified in any suitable manner, examples of which are discussed above in connection with block 102 of FIG. 1. When the peripheral is identified, an identifier for the peripheral may be obtained, which may be any suitable identifier of the particular peripheral or the type of peripheral. For example, an identifier for the peripheral that is assigned by the computing device when the peripheral is connected may be obtained (e.g., serial identifiers assigned to keyboards and mice by a computing device), or an identifier for the peripheral that is a serial number provided by a vendor or manufacturer of the peripheral may be obtained. Any suitable identifier may be used. In some cases, identifiers may be globally unique (e.g., no other instances of a peripheral attached to the computing device, to the network, or to any computing device use the same identifier) and/or may be persistent (e.g., the same identifier is used by the peripheral each time the peripheral is attached to the computing device).

In block 206, a loop is started, in which the potential sources of instructions registered in block 202 are queried to determine whether any of the potential sources have instructions regarding assignment of control of the peripheral identified in block 204. The software facilities that are queried in block 206 may be all those registered in block 202, or may be those that were identified as capable of providing instructions for the peripheral or type of peripheral identifier in block 204, or may be any suitable set of software facilities. The facilities may be selected in any suitable order, including according to an order in which they were registered, an order according to a hierarchy established, for example, according to a policy or by an administrator, or in any other suitable order.

In block 208, for a software facility to be queried, a query is sent via any suitable message-passing protocol for exchanging information within a computing device. The query may identify the peripheral for which control is to be assigned, such as by including the identifier for the peripheral obtained in block 204.

In block 210, a determination is made regarding whether the software facility queried provided instructions for how to assign control of the peripheral. If no instructions were received, the process 200 continues to block 212 to determine whether any more software facilities remain in the set to be queried. If so, process 200 returns to block 206 to select another software facility and issue another query for instructions. If it is determined in block 212 that no more software facilities remain, however, then the process 200 ends. Following the process 200, in some embodiments, the peripheral identified in block 204 may be assigned according to rules and policies, or may be assigned in any other suitable manner.

If it is determined in block 210 that an instruction was received, however, then process 200 continues to block 214, in which control of the peripheral is assigned according to the instruction received. Assigning of control may be carried out in any suitable manner, including according to techniques described above in connection with block 106 of FIG. 1. Once control is assigned in block 214, then the process 200 ends.

The exemplary process 200 was illustrated and described above as including a loop that queries each software facility in the set of software facilities one at a time, and stops querying the software facilities when an instruction is first received. Embodiments that query software facilities are not limited to querying facilities in this manner. In other embodiments, queries may be sent to each of the software facilities to be queried in parallel, and any responses that include instructions may be received and evaluated. If only one instruction is received, then the instruction may be used to assign control of the peripheral. If multiple instructions are received in response, however, then a decision may be made between the instructions to determine which instruction to follow. In some cases, the first or last instruction to be received may be followed. In other cases, outside information may be used to determine which instruction to follow, including input from a user/administrator or pre-established policy information indicating how to determine which instruction to follow. Any suitable process may be used for querying software facilities and determining which instruction to following when assigning control of peripherals.

FIG. 2 illustrated a process that may be carried out in some embodiments by a peripheral management facility for querying software facilities to receive instructions. FIG. 3 illustrates another exemplary process that may be carried out in some embodiments for a software facility to provide instructions to a peripheral management facility regarding how to assign control of peripherals. Embodiments are not limited to carrying out the exemplary process illustrated in FIG. 3.

The process 300 may be carried out by a driver for a peripheral that has been created by a vendor or manufacturer of a peripheral and installed on the computing device. When the computing device detects that the peripheral is connected to the computing device (e.g., when the peripheral is first connected or during a start-up process for the computing device), an initialization process may be carried out for the peripheral that includes instantiating (e.g., loading from disk into memory and executing) a driver for the peripheral. The initialization process, and the instantiating of the driver, may be carried out by components of an operating system of the computing device. When the driver is instantiated for the peripheral, the process 300 begins in block 302, and the driver may carry out any suitable start-up processing, including communicating with other pieces of software on the computing device, such as other components of the operating system. The start-up processing may include registering with the peripheral management facility as a potential source of instructions for a particular type of peripheral that the driver supports or a particular peripheral the driver supports, and storing some identifier for the type of peripheral and/or peripheral that the driver supports. In some cases, multiple identifiers may be stored in block 302, when multiple peripherals of a type related to the driver are connected to the computing device.

In accordance with techniques described herein, the driver may provide instruction to a peripheral management facility regarding how the control is to be assigned. Accordingly, in block 304, the driver may identify that control of the peripheral to which the driver relates has not yet been assigned. Identifying in block 304 may be carried out in any suitable manner In some embodiments, during the start-up processing, data may be stored by the driver, accessible to the driver, that indicates that the driver has not yet provided instruction to a peripheral management facility regarding how control of the peripheral should be assigned.

In block 306, the driver receives a query from a peripheral management facility inquiring whether the driver will provide instructions to the peripheral management facility regarding assignment of control of a particular peripheral. The query may include an identifier for a particular peripheral or type of peripheral for which control is to be assigned. In block 308, a determination is made regarding whether the identifier received in the query of block 306 matches the identifier (or one of the identifiers) stored in block 302. If so, then the query is determined to be a query for instructions regarding a peripheral to which the driver relates, and the driver will provide instructions in response to the query. If not, then process 300 returns to block 306 to wait for another query to be received. By checking the identifier received in the query, the driver will not respond to queries regarding peripherals with which the driver is not related, helping ensure that correct instructions are received and used by the peripheral management facility.

In block 310, when it is determined in block 308 that instructions will be provided, instructions regarding assignment of control of the peripheral are provided to the peripheral management facility in response to the query. The instructions that are provided may be any suitable instruction regarding assignment of control of the peripheral. In some embodiments, the instructions provided by the driver in block 310 may be instructions that are preconfigured in the driver, such that the driver will always provide those instructions in response to a query. For example, the driver may be configured to provide instructions identifying that one or more other peripherals form a composite peripheral with the peripheral for which the query was issued, and that control of the peripherals of the composite peripheral should be assigned together. As another example, the driver may be configured to provide instructions identifying that control of the peripheral should be assigned to a particular user session, or that a particular type of control of (e.g., ownership of, or particular access rights to) the peripheral should be assigned to a user session. In other embodiments, the driver may not be pre-configured with instructions, but instead may create the instructions based on any suitable information. For example, the driver may review other peripherals connected to the computing device, active user sessions on the computing device, or any other information, and create instructions regarding how control of a peripheral should be assigned on that computing device.

Regardless of how the instructions are created by the driver, in block 310 the instructions are provided to the peripheral management facility via any suitable message-passing protocol of the computing device as a response to the query. Once the instructions are provided, in block 312 the driver identifies that instructions have been provided for the peripheral, such as by overwriting the data stored in block 304 indicating that instructions had not yet been provided. This may be done such that if the driver receives other queries requesting instructions for assigning control of peripherals, the driver may determine that the driver has already provided instructions and may not provide instructions again.

Once the driver has identified in block 312 that instructions have been provided, the process 300 ends.

In the exemplary process 300 described above, the driver identifies a peripheral to which the driver relates in block 304 and subsequently, in block 306, receives a query regarding instructions for the driver. Embodiments are not limited to performing these operations in this way. In alternative embodiments, for example, a driver may receive a query from the peripheral management facility regarding instructions for assigning control of a peripheral and, in response to receiving the query, determine whether any peripherals to which the driver relates are connected to the computing device (e.g., carry out block 306 prior to block 304, or carry out block 304 as a part of block 306). Embodiments may be implemented in any suitable manner to provide instructions to a peripheral management facility, as embodiments are not limited to any particular manner of providing instructions.

Figure 4B:
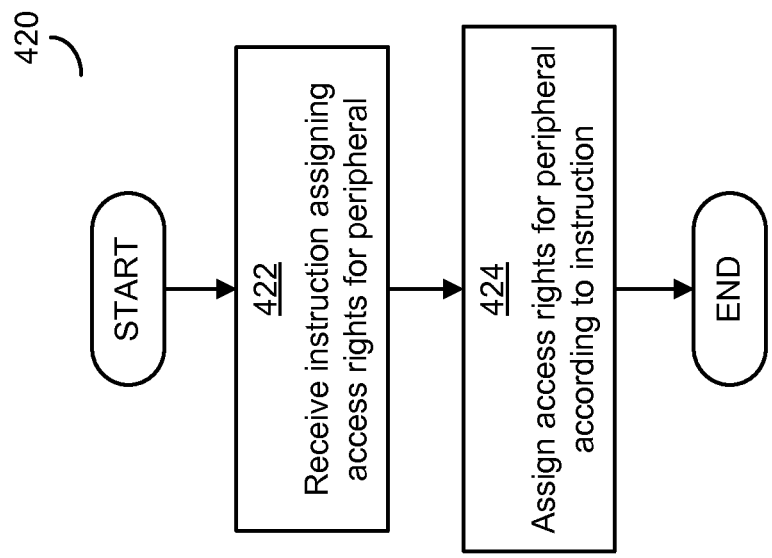
FIGS. 4A, 4B, and 4C are flowcharts of exemplary techniques for assigning control that may be carried out in some embodiments.
Figure 4A:
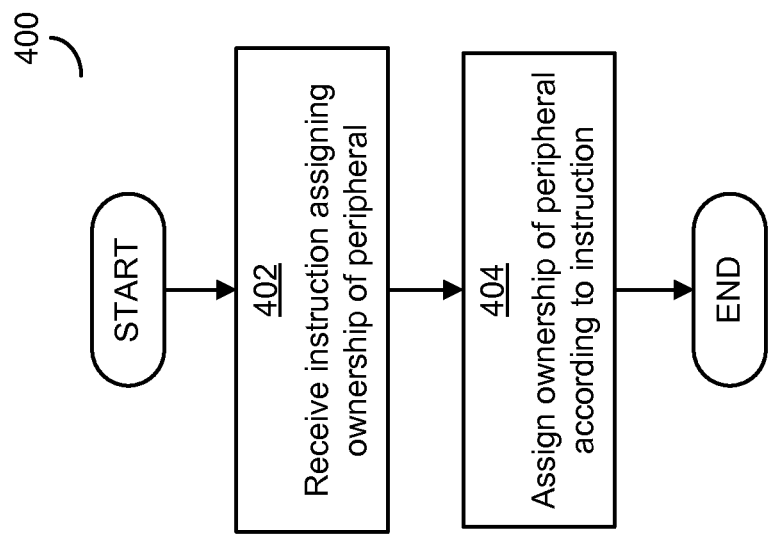
Figure 4C:
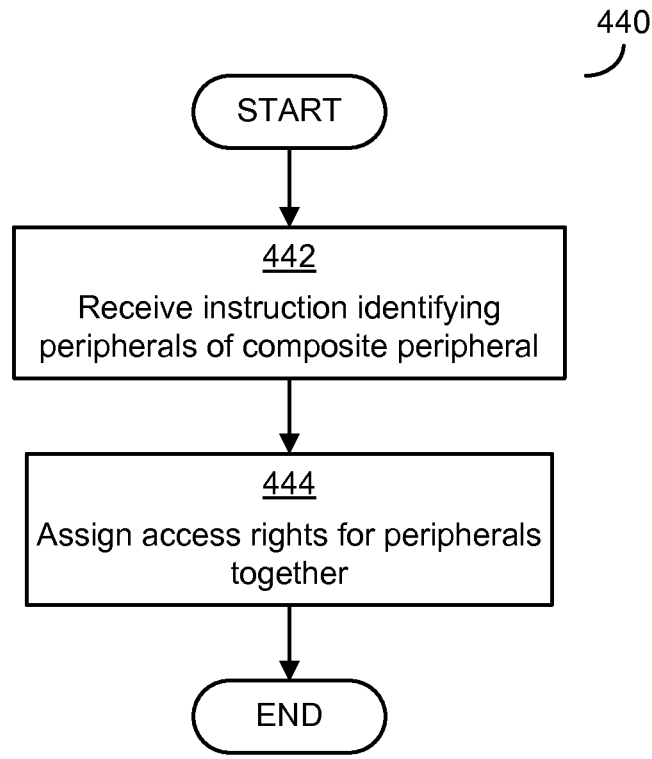

As discussed above, software facilities that provide instruction regarding how to assign control of peripherals may provide any suitable instruction that directs a peripheral management component to assign any suitable type of control. FIGS. 4A to 4C illustrate exemplary processes that may be carried out for exemplary types of control for which instructions are received. Embodiments are not limited to implementing the exemplary processes illustrated in FIGS. 4A to 4C, nor are embodiments limited to operating with the exemplary instructions for the particular types of control discussed in connection with these processes.

FIG. 4A illustrates a process 400 for assigning control of a peripheral by assigning ownership of a peripheral to a user session of the computing device. Process 400 begins in block 402, in which an instruction is received at a peripheral management facility instructing that ownership of the peripheral be assigned to a user session specified by the instruction. Ownership of the peripheral grants to the user session all access rights for using the peripheral as well as rights for managing the peripheral. Accessing the peripheral may include reading data from the peripheral, writing data to the peripheral, operating the peripheral to perform some task, or any other ways of interacting with the peripheral. Managing the peripheral may include disconnecting the peripheral, changing a driver for the peripheral, granting access to the peripheral to other parties, and other ways of configuring the peripheral and the way in which the peripheral interacts with the computing device. In block 404, ownership of the peripheral is assigned to the user session by updating records of the computing device associated with the peripheral to identify that ownership of the peripheral has been assigned to the user session specified by the instruction. Once the records have been updated in block 404, the process 400 ends, and a user operating the specified user session will be able to access and/or manage the peripheral.

FIG. 4B illustrates a process 420 for assigning control of a peripheral by assigning access rights for a peripheral to a user session of the computing device. The access rights assigned may include rights to read data from a peripheral, rights to write data to the peripheral, and/or rights to use the peripheral to perform specified tasks. In block 422, an instruction is received at a peripheral management facility instructing that particular access rights be assigned to a user session specified by the instruction. In block 404, access rights for the peripheral are assigned by updating records of the computing device associated with the peripheral. Once the records have been updated in block 424, the process 420 ends, and a user operating the specified user session will be able to access the peripheral in the specified ways.

While FIGS. 4A and 4B are illustrated separately and described as alternative procedures, in some embodiments the processes may be used together. For example, instruction may be received that direct ownership of a peripheral to be assigned to a particular user session and that access rights to the peripheral be provided to all or specified other user sessions.

Additionally, while in FIGS. 4A and 4B the instructions were described as specifying user sessions to which to assign control, in some embodiments the instructions may not specify user sessions precisely, but may specify generally that control should be assigned to one user session. The peripheral management facility, upon receiving the instruction, may then determine a particular user session to which to assign control. For example, a driver for a monitor may specify that ownership of the monitor should be assigned to a particular user session, such that only one user session is outputting content to the monitor at a time, but may not precisely identify the user session. Rather, the peripheral management facility will receive the instruction and identify a user session to which to assign the monitor. Embodiments may implement any suitable process for assigning control of peripherals to user sessions, as embodiments are not limited in this respect.

FIG. 4C shows another exemplary process 440 for assigning control of a peripheral, in which instructions are received regarding composite peripherals. As discussed above, a composite peripheral is two or more peripherals that are designed to be used together, such as two or more devices that are physically housed together or that interoperate. In embodiments, a computing device may identify each of the peripherals as individual, and unrelated, peripherals, and a software facility may instruct that control of composite devices be assigned together. Process 440 begins in block 442, in which an instruction is received that identifies two or more peripherals that are a composite peripheral and for which control should be assigned together. The instruction received in block 442 may or may not identify a particular type of control to be assigned (e.g., ownership of or access to the two or more peripherals) but may instead identify the composite peripheral such that other processes may be used to assign control of the peripherals together. For example, in embodiments that also use rules and policy to assign control of peripherals, the rules and policy may be used to assign control of the two or more peripherals together. In block 444, control of the two or more peripherals is assigned according to the instruction received in block 442. Where the instruction received specifies a type of control to be assigned, the assigning of block 444 may include assigning according to the type of control specified in the instruction by updating records associated with each of the two or more peripherals to reflect the access. Where the control identifies only the peripherals, the assigning of block 444 may include identifying that the two or more peripherals are to be assigned together, such that another process for assigning control may assign control of the peripherals together. Once control has been assigned in accordance with the instruction, the process 440 ends.

While the process 440 described that control peripherals of a composite peripheral are assigned similarly, embodiments are not limited to assigning control of peripherals of a composite peripheral in the same manner. In some embodiments, a software facility may instruct that control of some peripherals of a composite peripheral be assigned differently from other peripherals, as a software facility is not limited to instructing that any particular type of control be assigned. For example, one composite peripheral may include a printer, a scanner, and a memory card reader together in one physical housing. A software facility may instruct that the printer be available to all user sessions of the computing device, such that all users are able to print, but may instruct that the scanner and the memory card reader be available only to one user session, such that the data stored in the memory card or received via the scanner is available only to the one user session and maintained confidential.

In the examples described above, control of a peripheral is assigned according to instructions received when a peripheral is first detected or first connected. Embodiments are not limited to assigning control of a peripheral only once, but may assign and re-assign control of a peripheral at any time. Any suitable instructions may be received in any suitable manner at any suitable time regarding assignment of peripherals connected to a computing device.

Figure 5:
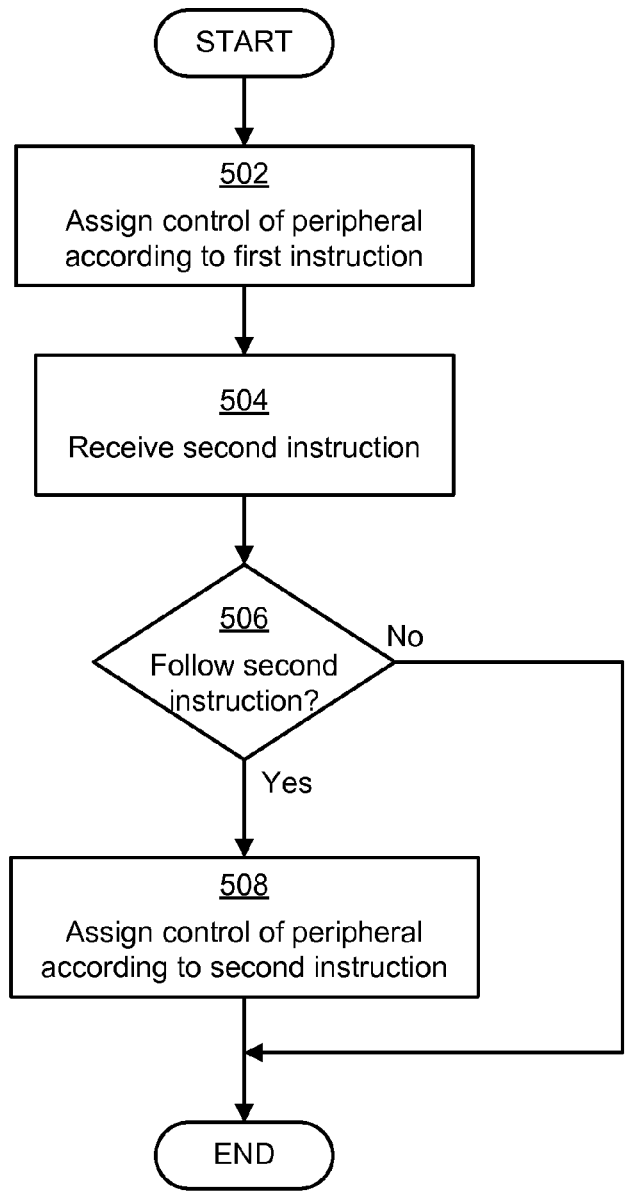
FIG. 5 is a flowchart of one process that may be carried out in some embodiments for re-assigning control of peripherals.

FIG. 5 shows one exemplary process 500 that may be used in some embodiments for re-assigning control of a peripheral according to instructions received from a software facility. Embodiments that enable reassignment of control of peripherals are not limited to implementing the process of FIG. 5.

Process 500 begins in block 502, in which control of a peripheral is assigned according to instructions received from a software facility. The assigning of block 502 may be carried out when the peripheral is first detected or is first connected, and may include assigning any suitable type of control to one or more user sessions.

In block 504, a second instruction is received regarding assignment of control of the peripheral for which control was assigned in block 502. The second instruction received in block 504 may be from the same software facility as the first instruction of block 502, or may be from a different software facility. For example, the first instruction may have been received in block 502 from a driver from the software facility, while the second instruction may be received in block 504 from an application program executing on the computing device. The second instruction may also direct the peripheral management facility receiving the second instruction to assign control of the peripheral in any suitable way, which may be exactly equal to, similar to, or completely different from control directed by the first instruction.

In block 506, a determination may be made regarding whether to follow the second instruction and change the manner in which control of the peripheral is assigned. The determination of block 506 may be made according to any suitable rules or policy. For example, a determination may be made to follow the second instruction based on a simple policy that all instructions will be followed, and the latest-received instruction is the one that will govern how control is assigned. As another example, a determination may be made about sources of the instructions, and a hierarchy of sources may be considered to determine whether the second instruction is received from a source higher in the hierarchy than the first. If the second instruction is received from a source higher in the hierarchy, then the instruction may be followed, but otherwise the instruction may be disregarded. The hierarchy may be any suitable hierarchy, including a hierarchy of users or user sessions, or a hierarchy of types of sources. For example, an administrator may be ranked above a user, or a driver may be ranked above a software application. As another example, a user or administrator may be prompted to provide input regarding whether to follow the second instruction. Any suitable information may be used to determine whether to follow the second instruction.

If a determination is made not to follow the second instruction, then the process 500 ends. If, however, a determination is made to follow the second instruction, then control is assigned in block 508 according to the second instruction. After control is assigned in block 508, the process 500 ends.

In each of the exemplary embodiments described above, assignment of peripherals according to instructions received from a software facility is carried out when the peripheral is detected or first connected to a computing device. Embodiments are not limited to assigning control of a peripheral each time a peripheral is detected or first connected, however. Rather, in some embodiments, control of a peripheral may be assigned according to instructions, and some information about that control or about that instruction may be stored in a persistent storage of the computing device (e.g., in a persistent store of the peripheral management facility and/or of an operating system of the computing device). Following storage of the information, when the peripheral is subsequently detected (e.g., at startup) or connected, the information about the control or about the instruction may be retrieved from the persistent storage and may be used to assign control of the peripheral in the same manner. In this way, in these embodiments assigning of control of a peripheral based on an instruction may be performed multiple times after receiving one instruction regarding the assignment of control. Though, some embodiments may not store any information about control or instructions and some embodiments may store such information only in temporary storage rather than in persistent storage.

As discussed above, embodiments are not limited to working with any particular computing device, peripheral, software facility, or type of control. Below is described one exemplary environment in which some embodiments may operate. Embodiments are not limited, though, to implementing any of the techniques described in connection with this exemplary embodiment or limited to operating with any of the exemplary types of devices and peripherals described in connection with this embodiment.

Figure 6:
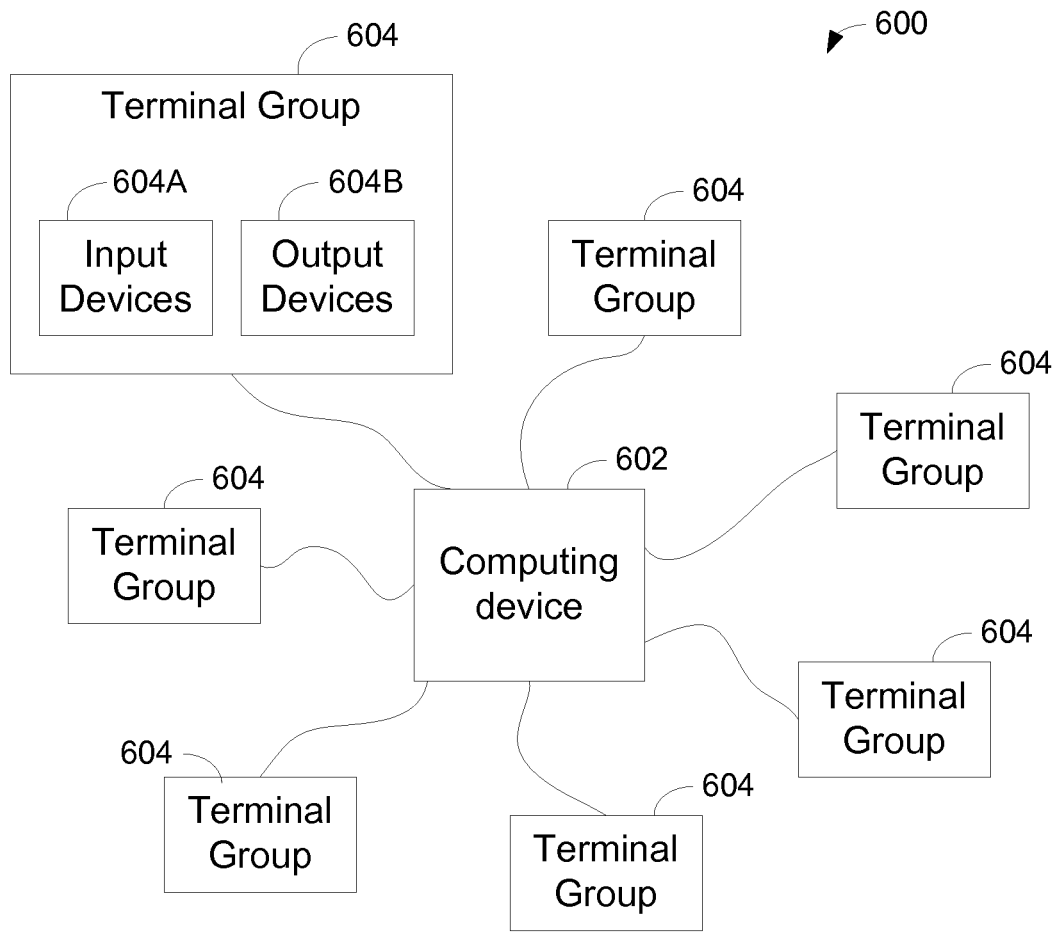
FIG. 6 is a block diagram of an exemplary computer system in which some embodiments may operate.

FIG. 6 illustrates one exemplary computer system 600 that includes a computing device 602. The computing device 602 may be adapted to be operated by multiple users simultaneously and to interact with each of the multiple users simultaneously. To enable each of the users to interact with the computing device 602, each user session that is associated with a user may be associated with a terminal group 604. Each terminal group 604 includes peripherals that are interface devices that a user can use to interact with the computing device 602, including input devices 604A to provide data to the computing device 602 and/or output device 604B to read data from the computing device 602. The peripherals of each terminal group may include any suitable number and type of peripherals, including a display, keyboard, and mouse, as well as any other type of peripheral (e.g., storage device). FIG. 6 illustrates seven terminal groups, but it should be appreciated that embodiments may operate with any suitable number of users and any suitable number of terminal groups.

Within each terminal group, peripherals may be connected to the computing device 602 in any suitable manner In some cases, individual peripherals may be directly connected to ports of the computing device 602. In other cases, multiple peripherals may be connected to one port of a computing device via a hub having multiple input ports connected to each of the peripherals and one output port connected to the computing device 602. In some cases, some of the peripherals of a terminal group may be directly connected to the computing device 602 and others may be connected via a hub.

Figure 7:
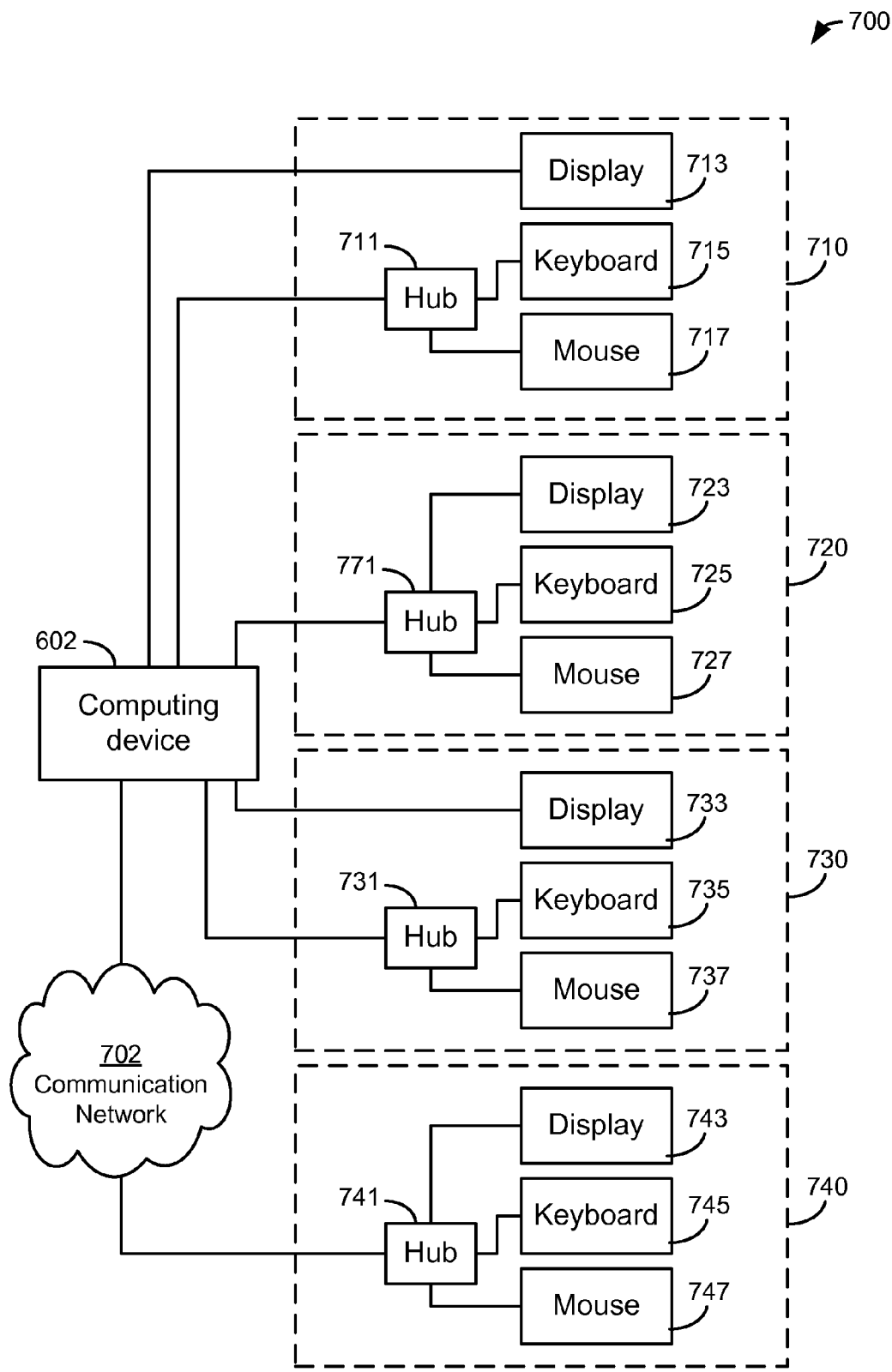
FIG. 7 is a block diagram of an exemplary computer system illustrating potential ways for connecting peripherals to a computing device.

FIG. 7 illustrates an exemplary connection of peripherals of terminal groups to a computing device 602. In a terminal group 710, a display 713 is directly connected to the computing device 602, such as via a video output port of the computing device 602. A keyboard 715 and a mouse 717 are connected to the computing device 602 indirectly, via a hub 711. The keyboard 715 and mouse 717 may be peripherals designed to be connected to the computing device 602 via Universal Serial Bus (USB), and the hub 711 may be a USB hub that has two or more input ports to connect to the keyboard 715 and mouse 717 and has one output port to connect to a USB port on the computing device 602. The hub acts to pass data back and forth between the computing device 602 and the peripherals 715, 717, as well as any other peripherals which are connected to the hub 711.

Terminal group 720 shows a slightly different arrangement, in which the display 723 of the terminal group 720 (and the keyboard 725 and the mouse 727) are connected to the computing device 602 via the hub 721. Terminal group 730 shows a configuration similar to terminal group 710, in which the display 733 is connected directly to the computing device 602 and the keyboard 735 and mouse 737 are connected via the hub 731.

Terminal group 740 shows an arrangement similar to terminal group 720, where the display 743, keyboard 745, and mouse 747 are connected to the computing device via a hub 741. Terminal group 740 is also connected to the computing device via a computer communication network 702. The terminal group 740 may be connected to a second computing device (not illustrated) that may be using a communication protocol to pass data entered via the keyboard 745 and mouse 747 to the computing device 602 via the network 702 and to pass graphic data generated by the computing device 602 to the display 743. Any suitable communication protocol may be used, including a terminal services protocol or a Microsoft® Remote Desktop Protocol (RDP), to pass data along any suitable wired and/or wireless communication network, including a local area network (LAN) and/or the Internet.

Figure 8:
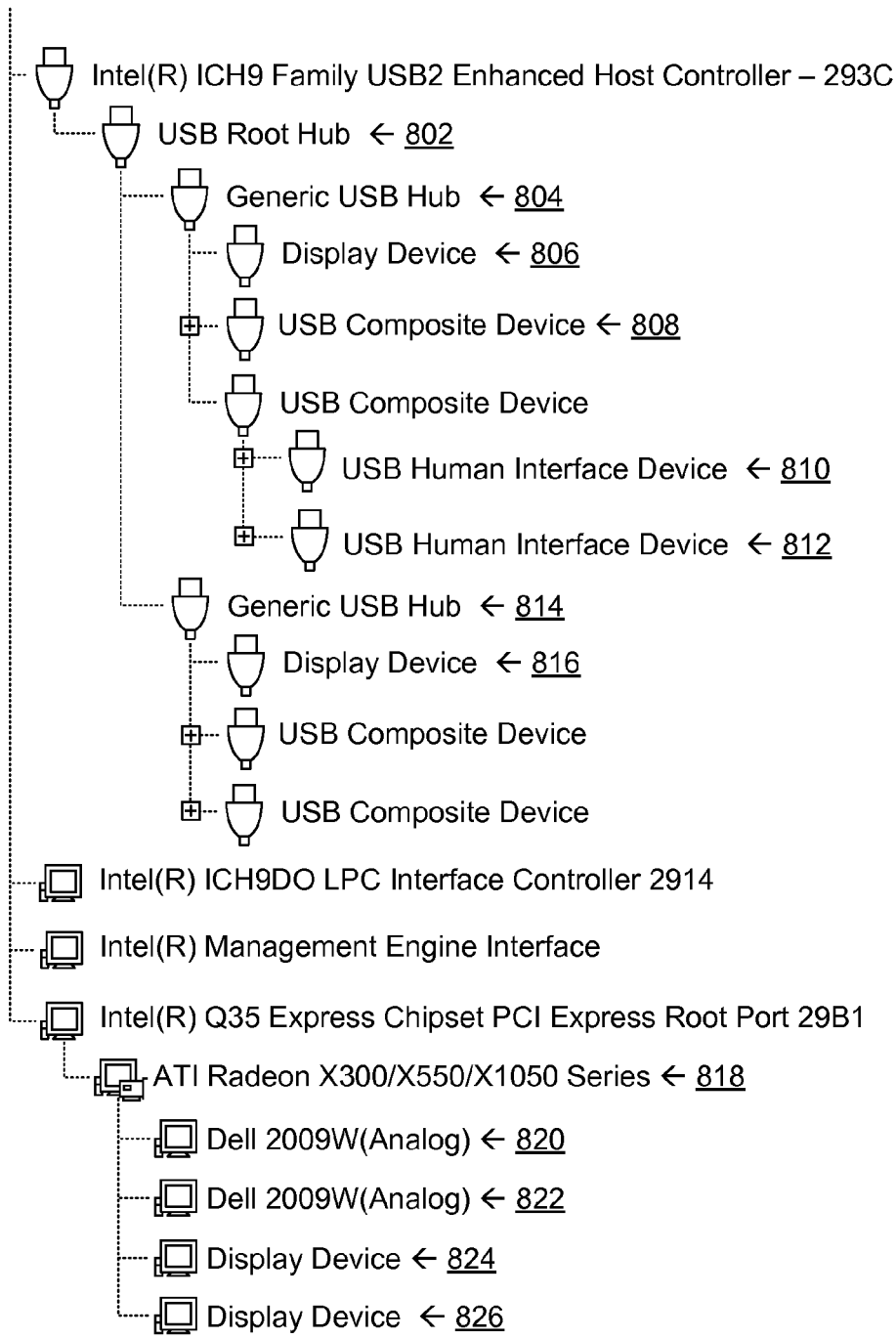
FIG. 8 is a diagram of an exemplary hierarchy of peripherals that may be created and managed by computing devices in some embodiments.

The computing device 602 may be configured to detect peripherals connected to the computing device 602 via the ports and communication buses of the computing device 602 and to determine a physical connection of computing devices. FIG. 8 illustrates one exemplary hierarchy 800 of peripherals connected to a computing device 602. Among other hardware, the computing device 602 includes a USB Root hub 802 that processes all data sent or received over the USB bus of the computing device 602 and a graphics card 818 that processes all graphics data generated by the computing device 602 to be displayed to users. As shown in the example of FIG. 8, the computing device 602 has detected that a USB hub 814 and a USB hub 814 are connected to the USB Root hub 802. Connected to the hub 804 are peripherals including a display 806, a composite device 808, and interface device 810 and 812. Connected to the hub 814 is a display device 816 and USB composite devices. The computing device has also detected that, connected to the graphics card 818, are displays 820, 822, 824, and 826.

When a peripheral is attached to the computing device 602, a determination may be made regarding which terminal group (and which user session) to which to assign control of the peripheral. Such a process may be used to create terminal groups or to add peripherals to existing terminal groups.

In some embodiments, a rules-based analysis of the peripherals detected to be connected to the computing device 602 may be conducted to determine terminal groups to which to relate devices. In such a rules-based process, devices that are connected in a similar way may be identified together as a terminal group, and devices that are connected in a different, similar way may be identified as a second terminal group. For example, all devices connected to one hub may be identified as one terminal group and all devices connected to another hub may be identified as another terminal group. Techniques for carrying out rules-based analyses are discussed in more detail in the '077 application and the '274 application.

However, such rules-based analyses may not be successful in all cases or may not assign devices appropriately in all cases. For example, the display devices connected to the computing device 602 via the graphics card 818 are shown in a different hierarchy from the peripherals connected to the computing device 602 via the USB Root hub 802. A rules-based analysis of the USB hierarchy might not process the display devices, and vice versa. Additionally, because there is no correlation between the hierarchies, there may not be a way for a rules-based analysis to match display devices to USB devices. As another example, as discussed above, a composite peripheral may be treated as entirely different peripherals by the computing device 602 and may be detected in different ways and placed at different points in the hierarchy. A review of the USB hierarchy, then, may lead to some peripherals of a USB composite peripheral being assigned to different terminal groups.

Further, in some cases a composite peripheral includes a display and a USB hub within the same physical housing. The USB hub includes at least two USB ports to which are intended to be connected a keyboard and mouse and any other peripherals a user may wish to connect to the computer. The display, USB hub, keyboard, and mouse are intended to form a composite peripheral and intended to form a terminal group, as a user would expect that a keyboard and mouse connected via the USB hub would be assigned to a same terminal group as the display such that the user can use all three together. However, the display device may be directly connected to the computing device 602 via the graphics port and the USB peripherals may be connected via the USB hub to the computing device. As discussed above, using a rules-based analysis, there may not be a way to ensure that the display will be assigned to the same terminal group as the USB hub. The user may then be required to perform a manual process to configure the terminal group, which is difficult and undesirable, as discussed above.

Figure 9:
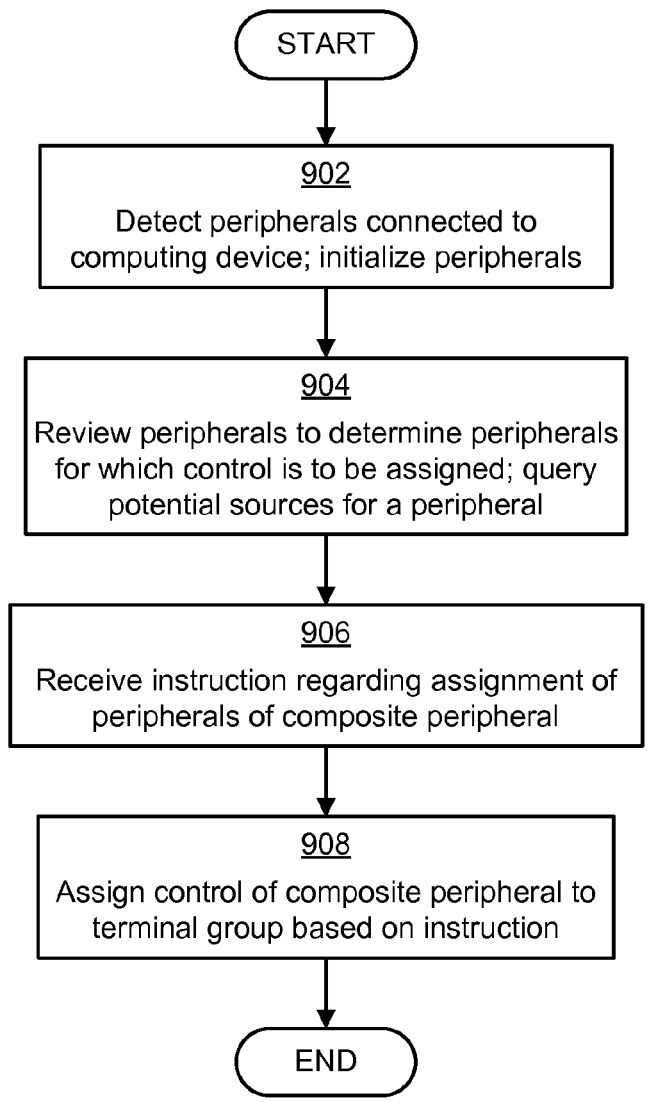
FIG. 9 is a flowchart of one exemplary technique for assigning control of composite devices that may be carried out in some embodiments.

In accordance with techniques described herein, instructions may be received from a software facility that may be used to determine how to assign control of peripherals to terminal groups and to user sessions. FIG. 9 illustrates one process that may be carried out in this embodiment to assign control of peripherals to a user session and form a terminal group from these peripherals. In the example of FIG. 9, peripherals connected to a computing device include the composite peripheral described above, including a display and a USB hub to which are attached a keyboard, mouse, and/or any other peripherals. Though, embodiments are not limited to operating with these types of peripherals or any other type of peripheral, and embodiments are not limited to implementing the exemplary process shown in FIG. 9.

The process 900 begins in block 902, in which each of the peripherals connected to the computing device 602 are detected and initialized. As part of the initialization for the peripherals, drivers may be instantiated for each of the devices. The display and USB hub of the composite peripheral are detected as being connected to the computing device 602 in block 902, and a driver is instantiated for each. The driver for the display device (and/or for the USB hub) may be preconfigured with knowledge that the display is a part of a composite peripheral that includes the USB hub. The driver may also be registered with a peripheral management device as a potential source of instructions regarding assignment of peripherals, as discussed above.

In block 904, following detection and initialization of devices, a peripheral management device may review the set of peripherals detected to be connected to the computing device to determine how to assign control of the peripherals. During the review, the peripheral management facility may query potential sources of instruction regarding assignment of control of peripherals that the peripheral management facility has detected have not yet had control assigned. As part of the querying, the peripheral management facility may query the driver instantiated for the display.

In block 906, the driver for the display may respond to the query identifying that the display forms a composite peripheral with the USB hub, and may identify the USB hub using an identifier for the USB hub. The driver may instruct the peripheral management facility that the display and the USB hub, and any peripherals connected via the USB hub, should be managed together as a group and assigned to a user session together as a group. The driver may not instruct that control be assigned to a particular user session, but may instruct that control be assigned for each to one user session.

In block 908, based on the instruction, the peripheral management facility may create a terminal group and associate control of the display, the USB hub, and devices connected via the USB hub to the terminal group. When a user session is created via the terminal group (e.g., a user logs in using the keyboard and display and creates a user session), the terminal group may be associated with the user session, such that control of the peripherals is assigned to the user session.

Once the control is assigned in block 908, the process 900 ends.

Figure 10:
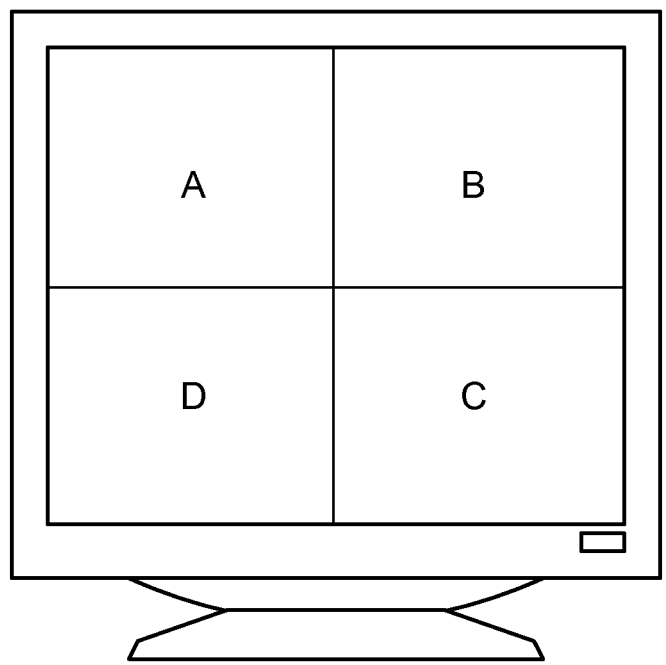
FIG. 10 is a block diagram of an exemplary way of assigning access to a display peripheral.

As discussed above, in some embodiments, assignment of control of a peripheral in accordance with instructions from a software facility may comprise assignment of access rights for the peripheral. The access rights for the peripheral may include a right to use a portion of a peripheral in a particular way or perform a particular task using a portion of the peripheral. In the case of displays, using a particular portion of the peripheral or performing a particular task using a portion of the peripheral may include using particular areas of a display. For example, as shown in FIG. 10, a display 1000 may be dividable into various areas A, B, C, and D. Assigning of access rights to the display may include assigning of access rights to a particular portion of a display. A software facility providing instructions regarding assignment of control of the display may instruct the peripheral management facility that the display is dividable into four areas and instruct the peripheral management facility to assign control of each of the four areas to a different user session, such that four users are able to use the display where only one user would have been able to use the display 1000.

In each of the examples described above, control of peripherals is assigned according to instructions received from software facilities and, where instructions are not received, control is assigned according to a rules-based analysis as described in the '077 application and the '274 application. In some embodiments, however, control of devices may be assigned according to a combination of instructions from software facilities, rules-based analysis, and/or user input.

For example, as discussed above, in some implementations of a rules-based analysis, control of output peripherals like displays may not be easily assigned according to rules. As such, after instructions have been received and rules have been applied, in some cases control of some output peripherals may still not be assigned. Users may be expecting to use the output peripherals, however, and so control should be assigned.

Figure 11A:
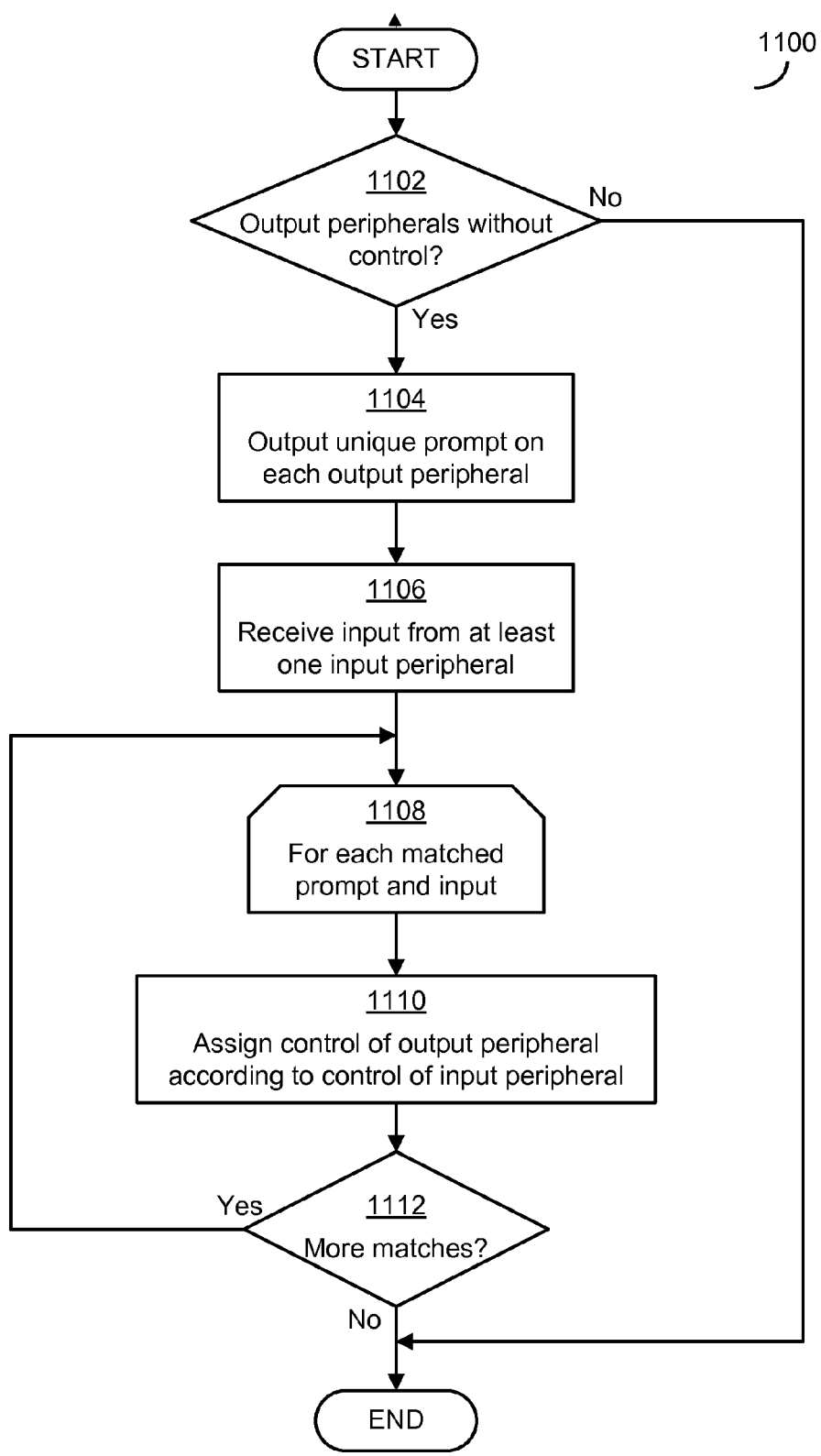
FIG. 11A is a flowchart of one exemplary process for assigning control of output peripherals based at least in part on user input.

FIG. 11A shows an example of one technique for assigning control of output peripherals based at least in part on user input. Embodiments are not limited to assigning control of output peripherals based on user input, and embodiments that do assign control based on user input are not limited to implementing the exemplary process illustrated in FIG. 11A.

Prior to the start of process 1100, control of peripherals may have been assigned according to instructions received from software facilities and/or according to rules of a rules-based analysis. Process 1100 begins in block 1102, in which a determination is made regarding whether any output peripherals remain for which control has not been assigned. If not, then the process 1100 ends.

Figure 11B:
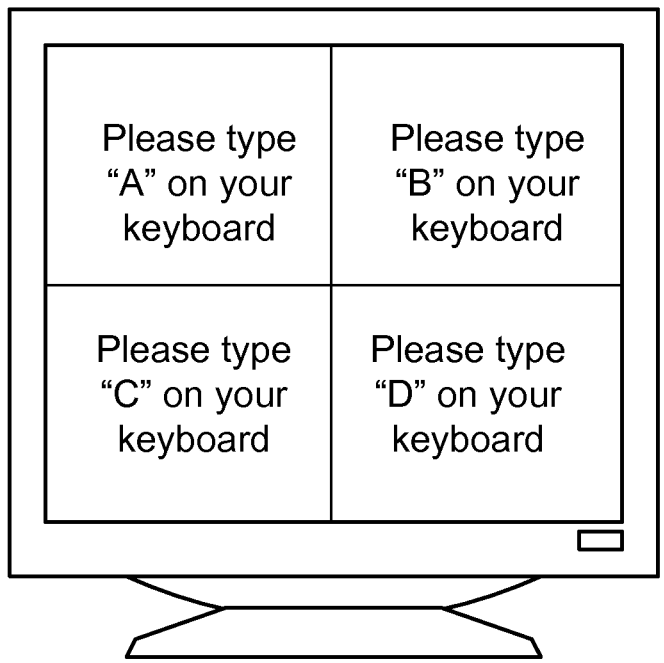
FIG. 11B is an illustration of an exemplary prompt that may be provided to a user to assign control of an output peripheral based at least in part on user input.

However, if it is determined in block 1102 that control of at least one output peripheral has not been assigned, then in block 1104 a unique prompt is output by the peripheral management facility to each such output peripheral. The unique prompt may be any prompt instructing a user to take some action. The prompt may be output in any suitable manner, which may vary based on the type of output peripheral on which the prompt is output. FIG. 11B shows an example of one such output, in which a display peripheral outputs a different prompt in different regions of the display screen instructing a user to provide particular input (i.e., "Press 'A' on your keyboard").

In block 1106, input is received from at least one input peripheral. The input received in block 1106 may, in some cases, include content corresponding to the unique prompt output in block 1104. When the content of the input corresponds to the unique prompt, a determination may be made that a user that expects to use a particular output peripheral for which control has not been assigned is also using the input peripheral from which the input was received. Assigning the unassigned output peripheral in the same manner as the input peripheral may therefore lead to the user being granted access to all the peripherals the user expects to use.

Accordingly, in block 1108, a loop is begun for each matched set of input and prompts (of the prompts output in block 1104 and the inputs received in block 1106). In block 1110, for a selected pair of prompt output from an output peripheral and input received from an input peripheral, control of the output peripheral is assigned in the same manner as the input peripheral. In block 1112, if more matches exist, the loop continues in block 1108 with another pair of output and input peripherals. If it is determined in block 1112 that more matches do not exist, then the process 1100 ends.

Techniques operating according to the principles described herein may be implemented in any suitable manner Included in the discussion above are a series of flow charts showing the steps and acts of various processes that assign control of peripherals based on instructions from software facilities. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit, or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package, for example as a software program application such as Microsoft® Windows® Multi-Point Server 2010. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Windows® operating system, available from the Microsoft® Corporation of Redmond, Wash. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1206 of FIG. 12 described below (i.e., as a portion of a computing device 1200) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 12:
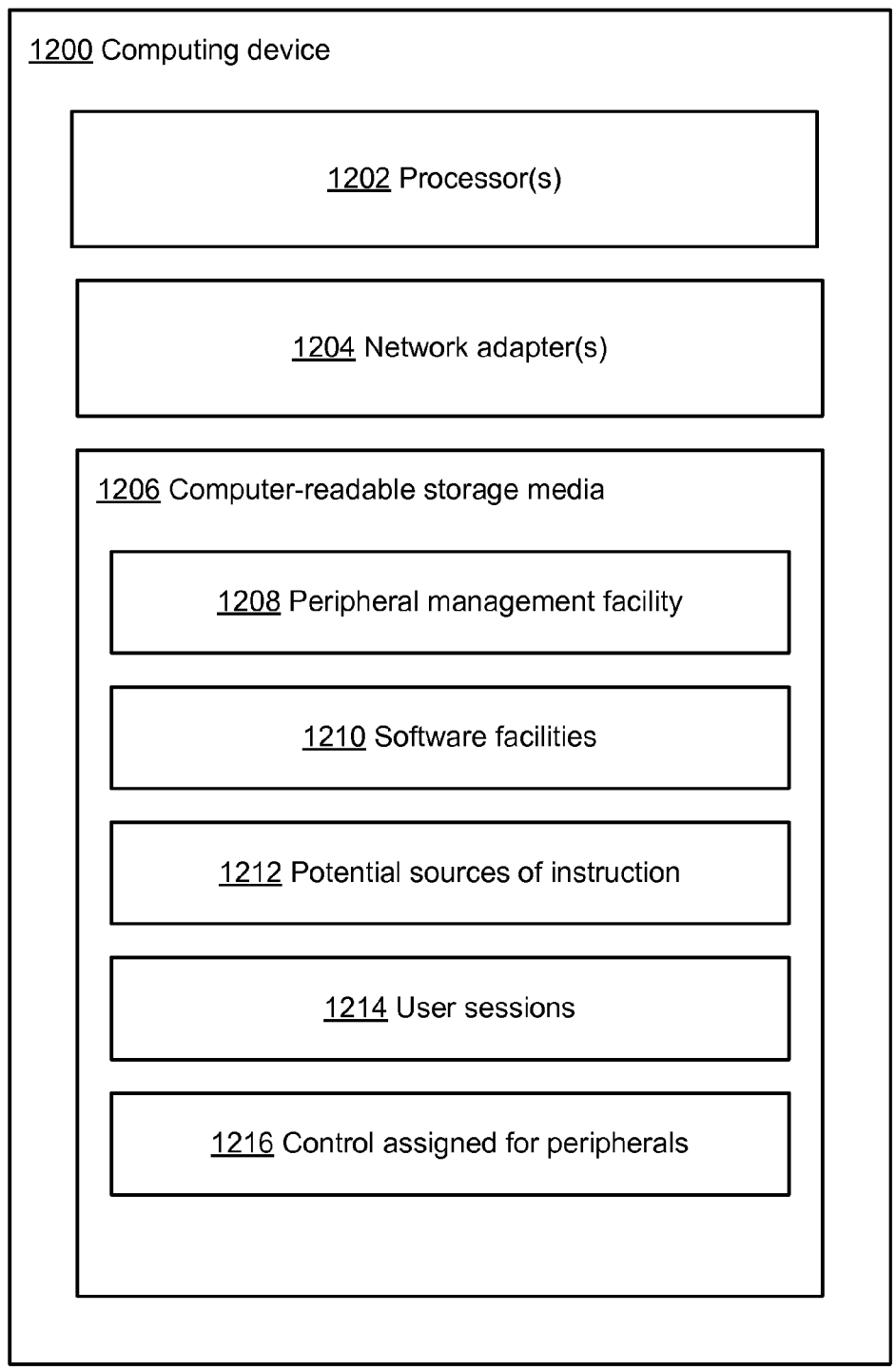
FIG. 12 is a block diagram of one exemplary computing device with which some embodiments may operate.

FIG. 12 illustrates one exemplary implementation of a computing device in the form of a computing device 1200 that may be used in a system implementing the techniques described herein, although others are possible. It should be appreciated that FIG. 12 is intended neither to be a depiction of necessary components for a computing device to operate in accordance with the principles described herein, nor a comprehensive depiction.

Computing device 1200 may comprise at least one processor 1202, a network adapter 1204, and computer-readable storage media 1206. Computing device 1200 may be, for example, a desktop or laptop personal computer, a mainframe, a server, a portable digital device such as a smart mobile phone, personal digital assistant, or portable gaming console, or any other suitable computing device. Network adapter 1204 may be any suitable hardware and/or software to enable the computing device 1200 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1206 may be adapted to store data to be processed and/or instructions to be executed by processor 1202. Processor 1202 enables processing of data and execution of instructions. The data and instructions may be stored on the computer-readable storage media 1206 and may, for example, enable communication between components of the computing device 1200.

The data and instructions stored on computer-readable storage media 1206 may comprise computer-executable instructions implementing techniques which operate according to the principles described herein. In the example of FIG. 12, computer-readable storage media 1206 stores computer-executable instructions implementing various facilities and storing various information as described above. Computer-readable storage media 1206 may store a peripheral management facility 1208 that assigns control of peripherals connected to the computing device 1200. Computer-readable storage media 1206 may also store one or more software facilities 1210 that provide instruction to the peripheral management facility regarding assignment of control of peripherals. Computer-readable storage media 1208 may also store a data store 1212 of information regarding potential sources of instruction that may be used for querying software facilities regarding assignment of control of peripherals (e.g., drivers and other software facilities registered with the peripheral management facility 1208), a data store 1214 of information regarding user sessions active on the computing device 1200, and a data store 1216 of information regarding control assigned for peripherals connected to the computing device 1200 (e.g., ownership or access rights assigned for peripherals, and to which user session the ownership or access rights were assigned).

While not illustrated in FIG. 12, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A computer system, comprising:
a single computing device;
a display device communicatively coupled to the single computing device;
at least one hub, including a plurality of input ports and a single output port, each of the plurality of input ports connects to a corresponding peripheral device, the output port connecting the at least one hub to the single computing device; and
the single computing device including the following processor-executable components:
a management component that forms a terminal group for the plurality of peripheral devices connected to the hub and associates the display device with the terminal group, and
a single instance of an operating system for the computer system that manages a single session for the users associated with the terminal group, the single session receiving input from the plurality of peripheral devices associated with the terminal group.

2. The system of claim 1, wherein the single session of the operating system executes a single instance of an application that receives inputs from the users through the peripheral devices.

3. The system of claim 1, wherein the peripheral devices include a plurality of pointing devices.

4. The system of claim 1, wherein the peripheral devices include a plurality of wireless mice.

5. The system of claim 1, wherein the at least one hub is communicatively coupled to the peripheral devices through a wireless connection.

6. The system of claim 1, wherein the single computing device is configured to perform processing on behalf of all users within the terminal group.

7. The system of claim 1, wherein the management component maps a display area associated with the display to the terminal group.

8. A method for configuring peripheral devices of a single computing device, the method implemented on a single computing device having at least one processor, the method comprising:
  detecting at least one management hub, the management hub including a plurality of input ports and a single output port, each input port connected to a corresponding peripheral device, the single output port connected to single computing device, the hub disposed between the corresponding peripheral device and the single computing device; ;
  for each management hub:
    detecting at least one peripheral device is coupled to the management hub;
    grouping the detected peripheral devices into a terminal group;
    associating at least one display device with the terminal group; and
    creating a session for the terminal group, the session associated with a single instance of an operating system for the single computing device, the session receiving input from the detected peripheral devices for display on the display device.

9. The method of claim 8, further comprising:
  mapping a select display area in the display device for each management hub.

10. The method of claim 9, wherein the user session is a single session of an application that receives inputs from users through the interface detected peripheral devices.

11. The method of claim 8, further comprising:
  coupling each peripheral device to the at least one management hub through a wireless connection.

12. The method of claim 8, wherein each peripheral device is a pointing device.

13. The method of claim 8, wherein each peripheral device is a mouse.

14. The method of claim 8, wherein at least one of the management hubs is a USB hub.

15. A computer-readable storage medium storing thereon processor-executable instructions that perform actions, comprising:
  forming at least one terminal group, the terminal group including one or more peripheral devices, each peripheral device associated with a user for use in interacting with a single computing device, each peripheral device connected to a hub through one of a plurality of input ports on the hub, the hub connected to the single computing device through a dedicated output port on the hub, the hub disposed between the peripheral device and the single computing device; and
  generating a user session for users of each interface device associated with the terminal group, the user session associated with a single instance of an operating system for the single computing device, the user session receiving input from the peripheral devices for display on a display device associated with the terminal group.

16. The computer-readable storage medium of claim 15, wherein the peripheral devices include a plurality of pointing devices coupled to the hub through a wireless connection.

17. The computer-readable storage medium of claim 15, wherein the terminal group is associated with a display area in the display device.

18. The computer-readable storage medium of claim 15, wherein the user session is a single session of an application that receives inputs from users through the interface devices.

19. The computer-readable storage medium of claim 15, wherein the user session is under control of a sole user.

20. The computer-readable storage medium of claim 15, further comprising:
  indicating a policy for use in forming a terminal group.

* * * * *